United States Patent
Shapira et al.

(10) Patent No.: US 9,171,403 B2
(45) Date of Patent: Oct. 27, 2015

(54) CONTOUR COMPLETION FOR AUGMENTING SURFACE RECONSTRUCTIONS

(71) Applicant: Microsoft Corporation, Redmond, WA (US)

(72) Inventors: Lior Shapira, Redmond, WA (US); Ran Gal, Redmond, WA (US); Eyal Ofek, Redmond, WA (US); Pushmeet Kohli, Cambridge (GB); Nathan Silberman, Brooklyn, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

(21) Appl. No.: 14/179,642

(22) Filed: Feb. 13, 2014

(65) Prior Publication Data

US 2015/0228114 A1    Aug. 13, 2015

(51) Int. Cl.
G06T 17/10      (2006.01)
G06T 15/40      (2011.01)
G06T 15/00      (2011.01)

(52) U.S. Cl.
CPC ............... G06T 17/10 (2013.01); G06T 15/005 (2013.01); G06T 15/40 (2013.01)

(58) Field of Classification Search
None
See application file for complete search history.

(56) References Cited

U.S. PATENT DOCUMENTS

| 6,674,877 B1 * | 1/2004 | Jojic et al. ..................... 382/103 |
| 7,961,934 B2 | 6/2011 | Thrun et al. |
| 2003/0072483 A1 * | 4/2003 | Chen ............................ 382/154 |
| 2004/0105580 A1 * | 6/2004 | Hager et al. .................. 382/154 |
| 2010/0315412 A1 | 12/2010 | Sinha et al. |
| 2014/0003705 A1 * | 1/2014 | Taguchi et al. ............... 382/154 |
| 2014/0139639 A1 * | 5/2014 | Wagner et al. ................. 348/46 |
| 2014/0320661 A1 * | 10/2014 | Sankar et al. ................. 348/158 |

OTHER PUBLICATIONS

Jia, Zhaoyin, et al. "3d-based reasoning with blocks, support, and stability." Computer Vision and Pattern Recognition (CVPR), 2013 IEEE Conference on. IEEE, 2013.*

Han, Jungong, et al. "Enhanced computer vision with microsoft kinect sensor: A review." Cybernetics, IEEE Transactions on 43.5 (2013): 1318-1334.*

Gupta, Swastik, Pablo Arbelaez, and Jagannath Malik. "Perceptual organization and recognition of indoor scenes from RGB-D images." Computer Vision and Pattern Recognition (CVPR), 2013 IEEE Conference on. IEEE, 2013.*

Lin, Dahua, Sanja Fidler, and Raquel Urtasun. "Holistic scene understanding for 3d object detection with rgbd cameras." Computer Vision (ICCV), 2013 IEEE International Conference on. IEEE, 2013.*

Adán, et al. "Reconstruction of Wall Surfaces Under Occlusion and Clutter in 3D Indoor Environments", In Technical Report, CMU-RI-TR-10-12, Apr. 2010, pp. 1-33.

(Continued)

*Primary Examiner* — Zhengxi Liu
(74) *Attorney, Agent, or Firm* — Steve Wight; Judy Yee; Micky Minhas

(57) ABSTRACT

Surface reconstruction contour completion embodiments are described which provide dense reconstruction of a scene from images captured from one or more viewpoints. Both a room layout and the full extent of partially occluded objects in a room can be inferred using a Contour Completion Random Field model to augment a reconstruction volume. The augmented reconstruction volume can then be used by any surface reconstruction pipeline to show previously occluded objects and surfaces.

17 Claims, 5 Drawing Sheets

(56) References Cited

OTHER PUBLICATIONS

Barinova, et al, "Geometric Image Parsing in Man-Made Envionments", In the 11th European Conference on Computer Vision, Sep. 2010, pp. 57-70.

Borrmann, et al., "The 3D Hough Transform for Plane Detection in Point Clouds: A Review and A New Accumulator Design", In Journal 3D Research, vol. 2, Issue 2, Mar. 2011, pp. 1-13.

Castellani et al., "Impoving Environment Modeling by Edge Occlusion Surace Completion", In Proceedings of the First International Symposium on 3D Data Processing Visualization and Transmission, Jun. 2002, pp. 672-675.

Curless, et al., "A Volumetric Method for Building Complex Models from Range Images", In Proceedings of the 23rd Annual Conference on Computer Graphics and Ineractive Techniques, Aug. 4, 1996, pp. 303-312.

Duda, et al., "Use of the Hough Transformation to Detect Lines and Curves in Pictures", In Communications of the ACM, vol. 15, Issue 1, Jan. 1972, pp. 11-15.

Dumitru, et al., "Interior Reconstuction using the 3d Hough Transform", In Proceeding of the International Archives of the Photogrammetry, Remote Sensing and Spatial Information Sciences, Feb. 25, 2013, pp. 65-72.

Furukawa, et al., "Manhattan-World Stereo", In IEEE Conference on Computer Vision and Pattern Recognition, Jun. 20, 2009, pp. 1422-1429.

Furukawa, et al., "Reconstructing Building Interiors from Images", In IEEE 12th International Conference on Computer Vision, Sep. 29, 2009, pp. 80-87.

Gallup, et al., "Piecewise Planar and Non-Planar Stereo for Urban Scene Reconstruction", In IEEE Conference on Computer Vision and Pattern Recognition, Jun. 13, 2010, pp. 1418-1425.

Guo, et al., "Beyond the Line of Sight: Labeling the Underlying Surfaces", In Proceedings of 12th European Conference on Computer Vision—vol. Part V, Oct. 7, 2012, pp. 761-774.

Guo, et al., "Support Surface Prediction in Indoor Scenes", In IEEE Int'l Conf. on Comp. Vision, Dec. 2013, pp. 2144-2151.

Hedau, et al., "Recovering Free Space of Indoor Scenes from a Single Image", In IEEE Conference on Computer Vision and Pattern Recognition, Jun. 16, 2012, pp. 2807-2814.

Henry, et al., "RGB-D Mapping: Using Depth Cameras for Dense 3d Modeling of Indoor Environments", In Proceedings of 12th International Symposium on Experimental Robotics, Dec. 18, 2010, pp. 447-491.

"Ikea catalog", Retrieved on: Nov. 28, 2013, Available at: http://info.ikea-usa.com/Catalog/, pp. 1-2.

Jegelka, et al., "Submodularity Beyond Submodular Energies: Coupling Edges in Graph Cuts", In IEEE Conference on Computer Vision and Pattern Recognition, Jun. 20, 2011, pp. 1897-1904.

Kim, et al., "3D Scene Understanding by Voxel-CRF", In Proceedings of IEEE Int'l Conf. on Comp Vision, Dec. 2013, pp. 1425-1432.

Kim, et al., "Acquiring 3D Indoor Environments with Variability and Repetition", In Proceedings of ACM Siggraph Asia, vol. 31, Issue 6, Nov. 2012, 12 pages.

Kohli, et al., "A Principled Deep Random Field Model for Image Segmentation", In IEEE Conference on Computer Vision and Pattern Recognition, Jun. 23, 2013, vol. 31, No. 6, pp. 138:1-138:11.

Kohli, et al , "Robust Higher Order Potentials for Enforcing Label Consistency", In IEEE Conference on Computer Vision and Pattern Recognition, Jun. 23, 2008, vol. 82, No. 3, pp. 302-324.

Lorensen, et al., "Marching Cubes: A High Resolution 3d Surface Construction Algorithm", In Proceedings of 14th Annual Conference on Computer Graphics and Interactive Techniques, vol. 21, Issue 4, Jul. 1987, pp. 163-169.

Nemhauser, et al., "An Analysis of Approximations for Maximizing Submodular Set Functions-I", In Proceedings of Mathematical Programming, Dec. 1, 1978, pp. 265-294.

Newcombe, et al., "KinectFusion: Real-Time Dense Surface Mapping and Tracking", In 10th IEEE International Symposium on Mixed and Augmented Reality, Oct. 26, 2011, pp. 127-136.

Nie, et al., "Voting spaces cooperation for 3D plane detection from monocular image sequences", In Proceedings of 3rd International Conference on Image Processing Theory, Tools and Applications, Oct. 15, 2012, pp. 135-140.

"Qualcomm Vuforia", Retrieved on: Nov. 28, 2013, Available at: https://www.vuforia.com/, pp. 1-2.

Salas-Moreno, et., "SLAM++: Simultaneous Localisation and Mapping at the Level of Objects", In IEEE Conference on Computer Vision and Pattern Recognition, Jun. 23, 2013, pp. 1352-1359.

Silberman, et al., "Indoor Segmentation and Support Inference from RGBD Images", In Proceedings of 12th European Conference on Computer Vision, Oct. 7, 2012, pp. 746-760.

Taylor, et al., "Parsing Indoor Scenes Using RGB-D Imagery", In Proceedings of Robotics: Science and Systems, Jul. 9, 2012, pp. 401-408.

Zheng, et al., "Beyond Point Clouds: Scene Understanding by Reasoning Geometry and Physics", In IEEE Conference on Computer Vision and Pattern Recognition, Jun. 25, 2013, pp. 3127-3134.

Kim, Y. M., N. J. Mitra, D-M Yan, L. Guibasm Aquiring 3D Indoor Environments with Variability and Repetition, ACM Trans. Graph., Nov. 2012, vol. 31, No. 6, pp. 138:1-138:11, ACM, New York, NY, USA.

Kim, B-S, P. Kohli, S. Savarese, 3D Scene Understanding by Voxel-CRF, Proceedings of the 2013 IEEE International Conference on Computer Vision, ICCV '13, Dec. 2013, pp. 1425-1432.

Wang, X., H. Wang, Markov Random Field Modeled Range Image Segmentation, Pattern Recogn. Lett., Feb. 2004, vol. 25, No. 3, Feb. 2004, pp. 367-375, Elsevier Science Inc., New York, NY, USA.

International Search Report, Jul. 13, 2015, pp. 1-12.

\* cited by examiner

CONTOUR COMPLETION FOR AUGMENTING SURFACE RECONSTRUCTIONS

BACKGROUND

The availability of commodity depth cameras and sensors such as Microsoft Corporation's Kinect® have enabled the development of methods which can densely reconstruct arbitrary scenes from captured depth images. The task of generating dense 3D reconstructions of scenes from depth images has seen great progress in the last few years. While part of this progress is due to algorithmic improvements, large strides have been made with the adoption of inexpensive depth cameras and the fusion of color and depth signals.

The combined use of depth and color images has been successfully demonstrated for the production of large-scale models of indoor scenes via both offline and online algorithms. Most red, green, blue and depth (RGB+D) reconstruction methods require data that show the scene from a multitude of viewpoints to provide a substantially accurate and complete surface reconstruction.

Accurate and complete surface reconstruction is of special importance in Augmented Reality (AR) applications which are increasingly being used for both entertainment and commercial purposes. For example, a recently introduced gaming platform asks users to scan an interior scene from multiple angles to construct a model of the scene. Using the densely reconstructed model, the platform overlays graphically generated characters and gaming elements. In another example, furniture retailers can enable customers to visualize how their furniture will look when installed without having to leave their homes. These AR applications often require a high fidelity dense reconstruction so that simulated physical phenomenon, such as lighting, shadow and object interactions can be produced in a plausible fashion.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In general, surface reconstruction contour completion technique embodiments described herein infer the layout of a complete reconstructed scene and the full extent of partially occluded objects in the reconstructed scene.

In one embodiment of the surface reconstruction contour completion technique, a partially reconstructed three dimensional (3D) scene is completed. A dense partial reconstruction volume of a three dimensional scene is received (for example, from a surface reconstruction pipeline) and surfaces are detected in the partial reconstruction volume. The surfaces are then classified into different types. The classified surfaces are used to infer the scene boundaries and the boundaries of partially occluded surfaces of objects in the partial reconstruction volume. The partial reconstruction volume is then updated to show the inferred boundaries of partially occluded surfaces of objects in the scene and the scene boundaries.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
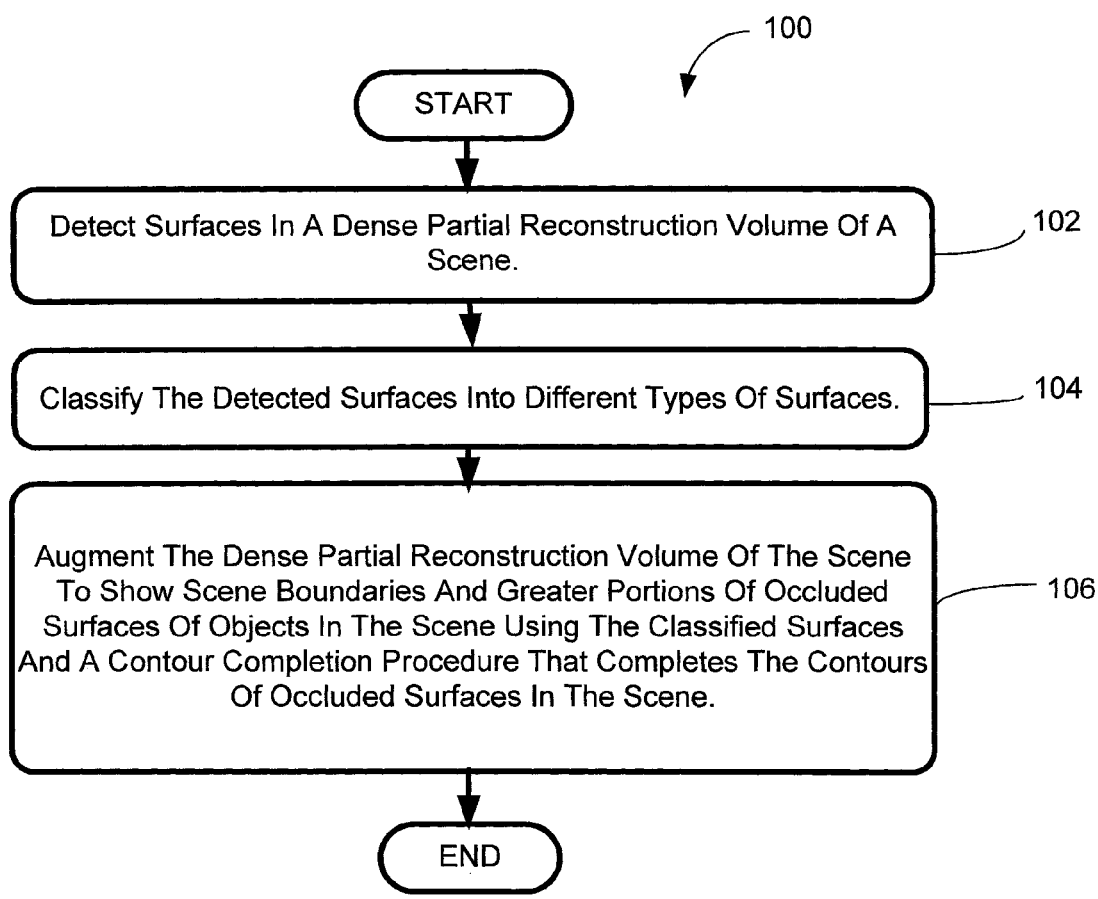
FIG. 1 depicts a flow diagram of an exemplary process for practicing one embodiment of the surface reconstruction contour completion technique described herein.

In the following description of surface reconstruction contour completion technique embodiments, reference is made to the accompanying drawings, which form a part thereof, and which show by way of illustration examples by which the surface reconstruction contour completion technique embodiments described herein may be practiced. It is to be understood that other embodiments may be utilized and structural changes may be made without departing from the scope of the claimed subject matter.

1.0 Surface Reconstruction Contour Completion

The following sections provide an introduction to the surface reconstruction contour completion technique embodiments described herein, as well as exemplary implementations of processes and an architecture for practicing these embodiments. Details of various embodiments and components are also provided.

As a preliminary matter, some of the figures that follow describe concepts in the context of one or more structural components, variously referred to as functionality, modules, features, elements, etc. The various components shown in the figures can be implemented in any manner. In one case, the illustrated separation of various components in the figures into distinct units may reflect the use of corresponding distinct components in an actual implementation. Alternatively, or in addition, any single component illustrated in the figures may be implemented by plural actual components. Alternatively, or in addition, the depiction of any two or more separate components in the figures may reflect different functions performed by a single actual component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner.

1.1 Introduction

In general, the surface reconstruction contour completion technique embodiments described herein perform surface reconstruction from one or more limited viewpoints, and "fill in" parts of a scene that are occluded or not visible to the camera or cameras that captured the scene. Basic scene understanding requires high level knowledge of how objects interact and extend in 3D space. While most scene understanding research is concerned with semantics and pixel labeling, relatively little work has gone into inferring object or surface extent, despite the prevalence and elemental nature of this faculty in humans. Online surface reconstruction pipelines, such as, for example, Microsoft Corporation's Kinect® Fusion, are highly suitable for augmented reality (AR) applications, but could benefit from a scene augmentation phase, integrated into the pipeline. Embodiments of the surface reconstruction contour completion technique provide such scene augmentation.

Embodiments of the surface reconstruction contour completion technique provide for many advantages. Holes and gaps in a reconstruction of a scene are filled in by completing the contours of occluded surfaces in the scene. This makes it unnecessary to capture a scene from multiple viewpoints in order to show the true extent and shape of occluded objects and scene surfaces. Furthermore, augmenting a reconstruction of a scene requires very little effort on the part of a user and occurs in real time. The augmented surface reconstructions created can also be used with many types of surface reconstruction pipelines.

Some surface reconstruction contour completion technique embodiments employ a Contour Completion Random Field (CCRF) model. This model completes or extends contours in 2D scenes. It also infers the extent of a scene and its objects. Furthermore, it provides the efficient re-integration of the inferred scene elements into a 3D scene representation to allow them to be used by a downstream application such as an AR application.

In one embodiment, a partial dense reconstruction of a scene is received that is represented as a point cloud in a voxel grid where each voxel's state can be occupied by a surface, free (of a surface) or its state is unknown. It should be noted that this representation is a very general representation of a surface and can be generated by sampling from many other types of representations of a scene (for example meshes) and the position of the cameras that captured the scene. In one embodiment the technique uses a real-time dense surface mapping and tracking procedure to compute this reconstruction volume which also assigns a surface normal and truncated signed distance function (TSDF) to the voxels. Microsoft Corporation's Kinect® Fusion, for example, is such a real-time dense surface mapping and tracking process that can be used. It maintains an active volume in Graphics Processing Unit (GPU) memory, updated regularly with new depth observations from a depth camera or sensor, such as for example, Microsoft Corporation's Kinect® sensor. Each depth frame is tracked using an iterative closest point procedure, and each depth frame updates the reconstruction volume which is represented as a truncated signed-distance function (TSDF) grid. At any point the TSDF volume may be rendered (for example, by using ray casting) or transformed into an explicit surface (for example, by using a marching cubes method or similar method). It should be noted that while one embodiment of surface contour completion employs a partial scene reconstruction volume created by Microsoft Corporation's Kinect® Fusion and Kinect® camera/sensor, any other type of scene reconstruction method and depth camera can be employed with the technique.

Given the reconstruction volume, in one embodiment surfaces are detected first. For example, planar surfaces in the scene are detected and each one is classified as being part of the scene layout (floor, walls ceiling) or part of an internal object in the scene. The identities of the planes are then used to extend them by solving a labeling problem using a CCRF model described herein. Unlike pairwise Markov Random Fields, which essentially encourage short boundaries, the CCRF model encourages discontinuities in the labeling to follow detected contour primitives such as lines or curves. The surface reconstruction contour completion technique embodiments described herein use this model to complete both the floor map for the scene and to estimate the extents of planar objects in the room. Finally the original input volume is augmented to portray the extended and filled scene. It should be noted that while this description primarily discusses planar surfaces, the surface reconstruction contour completion technique embodiments described herein can be applied to many other types of objects as well. For example, a cylindric object can be detected and the cylindric surface will be mapped to a plan, where the completion is done in a similar fashion as described herein. The same applies to many other types of surfaces, such as, for example, cones and spheres.

1.2 Exemplary Processes

As discussed above, Kinect® Fusion is a real-time dense surface mapping and tracking pipeline. It maintains an active volume in GPU memory, updated regularly with new depth observations from a Kinect® camera/sensor. Each depth frame is tracked and updates the reconstruction volume which is represented as a truncated signed-distance function (TSDF) volume/grid. At any point the TSDF volume may be rendered (for example, by using ray casting) or transformed into an explicit surface using a marching cubes algorithm (or similar algorithm). The surface reconstruction contour completion technique embodiments described herein extend this pipeline by accessing the TSDF volume at certain key frames (e.g., events where substantial new data is added), and augmenting it with inferred boundaries of occluded surfaces. As new depth observations reveal previously occluded voxels, the inferred augmentations are phased out. The surface reconstruction contour completion technique embodiments described herein may be used to augment other surface reconstruction methods with little change.

FIG. 1 depicts an exemplary process 100 for completing a dense partial 3D reconstruction of a scene. In this embodiment, surfaces (e.g., planar surfaces) in a dense partial 3D reconstruction volume of a scene are detected, as shown in block 102. The detected surfaces are then classified into different types of surfaces, as shown in block 104. For example, the detected surfaces can be classified into walls, a ceiling, a floor and internal surfaces.

The dense partial 3D reconstruction volume of the scene is then augmented to show scene boundaries and greater portions of partially occluded surfaces of objects in the scene using the classified surfaces and a contour completion procedure that completes the contours of occluded surfaces in the scene, as shown in block 106.

Figure 2:
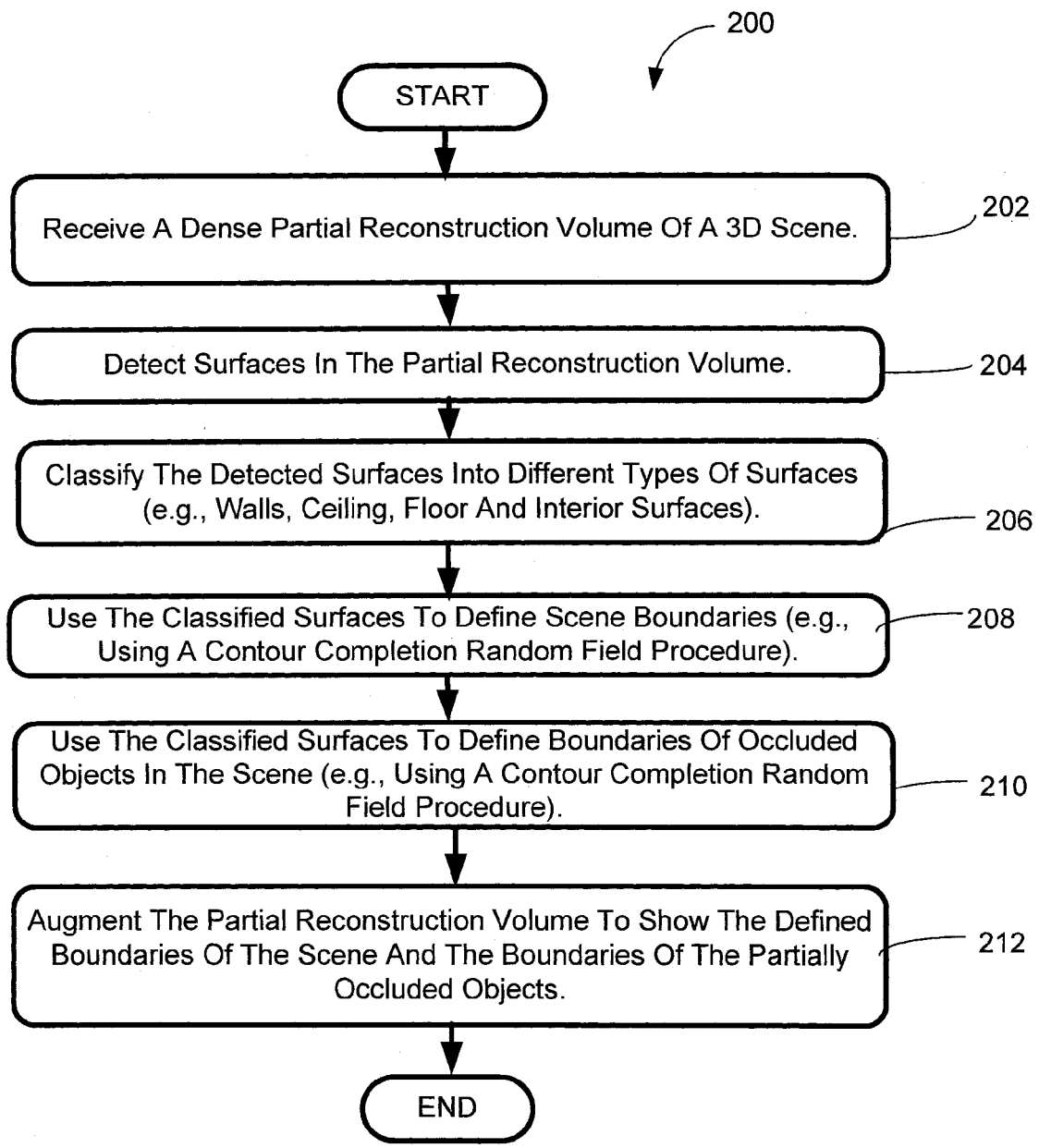
FIG. 2 depicts a flow diagram of another exemplary process for practicing another embodiment of the surface reconstruction contour completion technique described herein.

FIG. 2 depicts another exemplary process 200. In this embodiment 200 a partially reconstructed three dimensional (3D) scene is completed.

As shown in block 202, a dense 3D partial reconstruction volume of a three dimensional scene is received (for example, from a surface reconstruction pipeline). The partial 3D reconstruction volume can be received from a surface reconstruction pipeline that maintains the partial reconstruction volume of the scene that is updated with new depth observations of the scene. The dense reconstruction volume may be expressed as a volume of voxels (overlaid on a 3D point cloud). Every voxel can be labeled as having an observed surface at that voxel (e.g., occupied), free state where there is no observed surface at the voxel, or unknown (it is unknown whether or not there is a surface at that voxel).

Surfaces are detected in the partial reconstruction volume, as shown in block 204. Surfaces can be detected using a Hough transform and points can be associated to each of these surfaces. These surfaces can be any type of surface as long as they can be mapped to a plane. The details of detecting surfaces employed in some embodiments of the technique will be discussed in greater detail later.

The detected surfaces are classified into different types of surfaces, as shown in block 206. This can be done, for example, by using semantic labeling and a classifier that classifies the surfaces into scene boundaries such as wall, floor, ceiling and internal surfaces. The surfaces can be classified into semantic classes using a trained classifier which predicts each surfaces class using ground truth labels and 3D features. The classifier captures attributes of each surface including its height, size and surface normal distribution. A Random Forest classifier can be used to classify the surfaces, but many other types of classifiers can also be used, like, for example, Support Vector Machines (SVMs), boosted linear classifiers and so forth. The details of classifying surfaces employed in some embodiments of the technique are discussed in greater detail later.

As shown in block 208, the classified surfaces are used to define the scene boundaries that are in the partial reconstruction volume of the scene. This can be done, for example, by using the contour completion random field (CCRF) model previously discussed. The CCRF model completes the contours of occluded surfaces in the scene by minimizing an energy function that determines whether a point on a contour lies on a surface or not and labels the point as being on the contour of the surface or not. Two neighboring points that are assigned different labels as to belonging to a contour of a surface or not are assigned a penalty when determining whether the points belong to the contour of the surface. The contours of occluded surfaces in the scene can be completed using lines and parabolas fitted to visible parts of the contours of the surfaces. An exemplary process for using the CCRF model to complete contours is described in greater detail later.

The boundaries of partially occluded surfaces of objects in the partial reconstruction volume are also inferred, as shown in block 210. Again, this can be done, for example, by using the CCRF model previously discussed. The contours of occluded objects in the scene can be completed using lines and parabolas fitted to visible parts of the contours of the surfaces of the occluded objects.

The partial 3D reconstruction volume is then augmented to show the determined boundaries of partially occluded surfaces of objects in the scene and the scene boundaries, as shown in block 212. An exemplary process for augmenting the partial 3D reconstruction volume is described in greater detail later.

Exemplary processes for practicing the technique having been provided, the following section discussed an exemplary system for practicing the technique.

1.3 An Exemplary System

Figure 3:
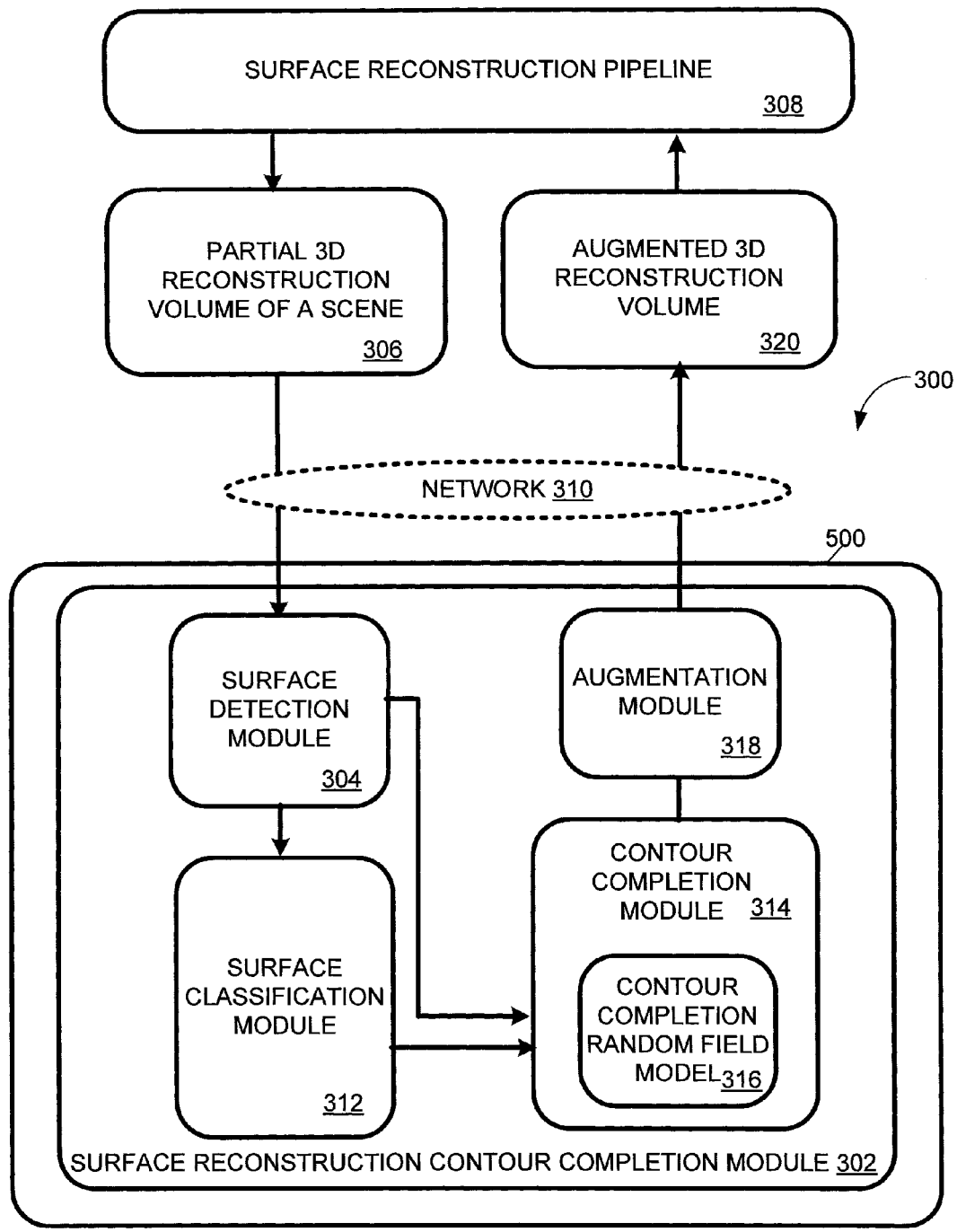
FIG. 3 depicts a system for implementing one exemplary embodiment of the surface reconstruction contour completion technique described herein.

FIG. 3 provides an exemplary system 300 for practicing embodiments described herein. A surface reconstruction contour completion module 302 resides on a computing device 500 such as is described in greater detail with respect to FIG. 5.

As shown FIG. 3, a surface detection module 302 of the surface reconstruction contour completion module 304 detects surfaces in an input partial 3D reconstruction volume 306. The partial reconstruction volume 306 can be received from a surface reconstruction pipeline 308 that maintains the partial reconstruction volume of the scene and updates it with new depth observations of the scene.

It should be noted that the partial 3D reconstruction volume 306 can be received from the surface reconstruction pipeline 308 over a network 310 (e.g., if the surface reconstruction pipeline resides on a server or a computing cloud). Alternately, the surface reconstruction pipeline can reside on the same computing device 500 as the surface reconstruction contour completion module 302. (It should be noted that the whole pipeline may lie on a computing cloud. Input in a form of depth videos may be included from one or more clients, fused and a final completion can be generated. The final model (or current depth view) may then be sent back to the clients.)

The partial 3D reconstruction volume 306 may be expressed as a volume of voxels (overlaid on a 3D point cloud). Every voxel can be labeled as having an observed surface at that voxel (labeled as occupied), free state where there is no observed surface at the voxel, or unknown (it is unknown whether or not there is a surface at that voxel).

A surface classification module 312 classifies the detected surfaces in the partial 3D reconstruction volume 306. Surfaces can be detected using a Hough transform and points can be associated to each of these surfaces. The surface classification module 312 classifies the detected surfaces into different types of surfaces, for example, by using semantic labeling and a classifier that classifies the surfaces into scene boundaries such as wall, floor, ceiling and internal surfaces. The classified surfaces are used to define the scene boundaries in the partial reconstruction volume of the scene. This can be done, for example, by using a contour completion module 314 and a CCRF model 316 previously discussed. The contours of occluded surfaces in the scene can be completed using lines and parabolas fitted to visible parts of the contours of the surfaces.

The boundaries of partially occluded surfaces of objects in the partial reconstruction volume 306 are also determined using the contour completion module 314. Again, this can be done, for example, by using the CCRF model 314 previously discussed. The contours of occluded objects in the scene can also be completed using lines and parabolas fitted to visible parts of the contours of the surfaces of the occluded objects.

The completed contours of the detected and classified surfaces in the partial 3D reconstruction volume 306 are used by an augmentation module 318 to create an augmented 3D reconstruction volume 320 that depicts greater portions of partially occluded surfaces of objects in the scene and the scene boundaries. This augmented 3D reconstruction volume 320 is then fed back in to the surface reconstruction pipeline 308. The augmented 3D reconstruction volume 320 can be updated in real-time.

1.4 Details and Exemplary Computations

A description of exemplary processes and an exemplary system for practicing the surface reconstruction contour completion embodiments having been provided, the following sections provide a description of an exemplary surface reconstruction pipeline that can be used along with details and exemplary computations for various surface reconstruction contour completion technique embodiments.

1.4.1 Exemplary Surface Reconstruction Pipeline

As discussed previously, the surface reconstruction contour completion technique embodiments can be used with various surface reconstruction pipelines. One such surface reconstruction pipeline, which is used with one exemplary embodiment of the technique, is Microsoft Corporation's Kinect® Fusion pipeline. A brief description of this pipeline is described in the paragraphs below in order to provide some background information with respect to an exemplary surface reconstruction pipeline that can be used with the technique.

The Kinect® Fusion system reconstructs a single dense surface model with smooth surfaces by integrating the depth data from a depth camera or sensor, such as, for example, Microsoft Corporation's Kinect®, over time from multiple viewpoints. The camera pose is tracked as the camera/sensor is moved (its location and orientation) and because each frame's pose and how it relates to the others is known, these multiple viewpoints of objects or the environment can be fused (averaged) together into a single reconstruction voxel volume. The voxel volume can be thought of as a large virtual cube in space (the reconstruction volume), located around the scene in the real world, and depth data (i.e. measurements of where the surfaces are) integrated into this as the sensor is moved around.

The Kinect® Fusion processing pipeline involves several stages to go from the raw depth data to a 3D reconstruction. The first stage is a depth map conversion that takes the raw depth data from the Kinect® camera/sensor and converts it into floating point depth data in meters, followed by an optional conversion to an oriented point cloud which consists of 3D points/vertices in the camera coordinate system, and the surface normals (orientation of the surface) at these points.

The second stage calculates the global/world camera pose (its location and orientation) and tracks this pose as the Kinect® sensor moves in each frame using an iterative alignment algorithm, so that the Kinect® Fusion system always knows the current sensor/camera pose relative to the initial starting frame. There are two algorithms in Kinect® Fusion. The first can either be used to align point clouds calculated from the reconstruction with new incoming point clouds from the Kinect® camera depth, or standalone (for example, to align two separate cameras viewing the same scene). The second algorithm provides more accurate camera tracking results when working with a reconstruction volume, however, this may be less robust to objects which move in a scene.

The third stage is fusing (or "integration") of the depth data from the known sensor pose into a single volumetric representation of the space around the camera. This integration of the depth data is performed per-frame, continuously, with a running average to reduce noise, yet handles some dynamic changes in the scene.

The reconstruction volume can be raycast from a sensor pose (which is typically, but not limited to, the current Kinect® sensor pose), and this resultant point cloud can be shaded for a rendered visible image of the 3D reconstruction volume.

1.4.2 Input

The surface reconstruction contour completion technique embodiments can be used with various input representations.

In one exemplary embodiment, the 3D reconstruction volume is represented as a cloud of 3D sensed points such as that described above with respect to the Kinect® Fusion pipeline. These points lie on surfaces in the environment. Note that the input may have different representations, such as an incomplete mesh of the environment, or as implicit representations of the surfaces (such as a 3D function that is stored at regular points in space and it is positive on one side of the surface and negative on the other). It is possible to extend the following description to different representations, but all those representations can be approximated as a cloud of 3D points.

In one embodiment a voxel grid (over a 3D point cloud) and a set of surface normals is received. Each voxel in the grid represents a surface observation (occupied), free space or unknown and each occupied voxel has already been assigned a surface normal. While one embodiment of the technique uses a truncated signed distance function (TSDF) and surface normals produced by Kinect® Fusion, any voxel grid that encodes these three states and the corresponding surface normals would suffice.

Figure 4:
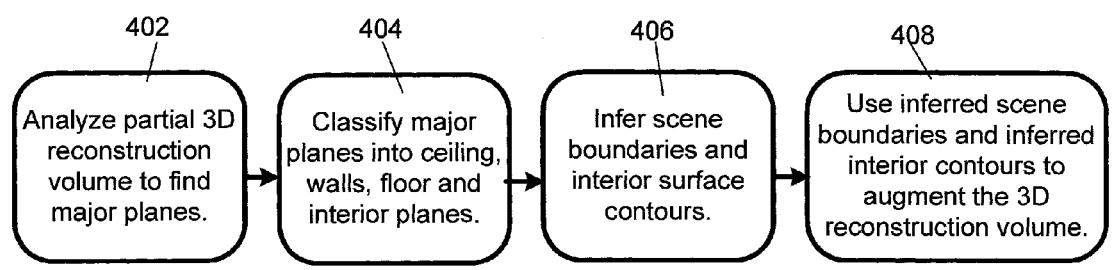
FIG. 4 depicts a diagram of using one embodiment of the surface reconstruction contour completion technique to augment a reconstruction volume in a surface reconstruction pipeline.

As will be described in greater detail in the following paragraphs, given this input, the technique embodiments first detect surfaces, for example, planar surfaces, and classify each one as being part of the scene layout (floor, walls ceiling) or part of an internal object in the scene. Using the identities of each plane, two stages of scene extension are performed. First, a floor map is completed providing an enclosed 3D model of the room. Second, the extents of surfaces of objects in the room are determined, for example planar surfaces of objects in the room. Finally the original input volume is augmented to account for the extended and filled scene. The stages of an exemplary process are demonstrated in FIG. 4. As shown in FIG. 4, block 402, a received 3D partial dense reconstruction volume is analyzed to find the major planes. As shown in block 404, the major planes are classified into ceiling, walls, floor and interior planes. The scene boundaries and the shape of any partially occluded interior objects are inferred, as shown in block 406. The inferred scene boundaries and interior objected are used to produce the complete reconstructed scene, as shown in block 408. Details of exemplary computations for each of the actions in blocks 402 through 408 are described in detail in the paragraphs below.

1.4.3 Plane Detection and Classification

As shown in FIG. 4, block 402, the received partial 3D reconstruction volume is analyzed to find the major planar surfaces. The following paragraphs describe how the technique detects the dominant planes from the partial voxel based reconstruction. The space of all possible 3D planes is denoted by $\mathbb{H}$, and the set of planes present in the scene is denoted by H. Let the set of all 3D points visible in the scene be denoted by $P=\{p_1, \ldots p_N\}$. The technique estimates the most probable labeling for H by minimizing the following energy function:

$$H* = \arg\min_{H \subset \mathbb{H}} \sum_{i=1}^{N} f_i(H) + \lambda |H|. \qquad (1)$$

where $\lambda$ is a penalty on the number of planes and $f_i$ is a function that penalizes the number of points not explained by any plane:

$f_i(H) = \min\{\min_{h \in H} [\delta(p_i, h), \lambda_b]\}$, where the function $\delta$ returns a value of 0 if point $p_i$ falls on plane h and is infinity otherwise. Minimizing the first term alone has the trivial degenerate solution where a plane is included for every point $p_i$ in the set H. However, this situation is avoided by the second terms of the energy which acts as a regularizer and adds a penalty that linearly increases with the cardinality of H.

1.4.3.1 Detecting a Set of Surfaces

In one exemplary embodiment of the surface reconstruction contour completion technique a greedy strategy is employed, starting from an empty set and repeatedly adding the element that leads to the greatest energy reduction. This method has been observed to achieve a good approximation. It begins by using a Hough transform to select a finite set of surfaces (e.g., planes). In one embodiment, each 3D point and its surface normal votes for a plane equation parameterized by its azimuth $\theta$, elevation $\psi$ and distance from the origin $\rho$. Each of these votes is accrued in an accumulator matrix of size A×E×D where A is the number of azimuth bins, E is the number of elevation bins and D is the number of distance bins (in one embodiment A=128, E=64 was used and D was found dynamically by spacing bin edges of size 5 cm apart by the maximum and minimum points). After each point has voted, a non-maximal suppression procedure is run to avoid accepting multiple planes that are too similar.

Once a set of candidate surfaces (e.g., planes) has been determined the technique sorts them in descending order by the number of votes they have received and iteratively associates points to each plane. A point can be associated to a plane if it has not been previously associated to any other plane and if its planar disparity and local surface normal difference are small enough (in one embodiment a planar disparity threshold of 0.1, and an angular disparity threshold of 0.1 was used). As an additional heuristic, each new plane and its associated points are broken into a set of connected components ensuring that planes are locally connected.

1.4.3.2 Classification of Surfaces/Planes with Semantic Labeling

As shown in FIG. 4, block 404, once a set of planes has been determined, each one is classified independently into one of four semantic classes: floor, wall, ceiling and internal. To do so, in one embodiment a Random Forest Classifier is trained to predict each plane's class using the ground truth labels and 3D features using a procedure which captures attributes of each plane including its height in the room, size and surface normal distribution. Planes classified as one of floor, wall and ceiling are used for inferring the floor plan and scene boundaries, whereas internal planes are extended and filled in a subsequent step.

One embodiment uses a procedure for fast parabola fitting, described later in greater detail. Starting with an input image, the contact points and contour edges are found. Next, the contact points are aligned and a parabola is fitted using several radii to find the best fit.

1.4.4 Scene Completion

Given the set of detected and classified planes the surface reconstruction contour completion technique embodiments described herein infer the true extent of the scene (e.g., it obtains an enclosed room structure), and extend interior planes based on evidence from the scene itself, as shown in FIG. 4, block 406.

1.4.4.1 Surface Boundary Completion as a Pixel Labeling Problem

The following paragraphs describe the mathematical computations used to estimate the boundaries of surfaces (e.g., planes) as seen from a top-down view in one exemplary embodiment. Boundary completion is formulated as a pixel labeling problem. Consider a set S of nodes that represent grid locations in the top-down view of the scene. It is assumed that a partial labeling of nodes i∈S in the grid can be observed and is encoded by variables $y_i$; i∈S where $y_i$=1, $y_i$=0 and $y_i$=−1 represent that i belongs to the plane, does not belong to the plane, and its membership is uncertain respectively. Given y, it is desired to estimate the true extent of the plane which is denoted by x. Specifically, the binary variable $x_i$ is used to encode whether the plane covers the location of node i in the top-view. $x_i$=1 represents that node i belongs to the plane while $x_1$=0 represents that it does not.

The traditional approach for pixel labeling problems is to use a pairwise Markov Random Field (MRF) model. The energy of any labeling y under the pairwise MRF model is defined as:

$$E(x) = \Sigma_{i \in S} \phi_i(x_i) + \Sigma_{ij \in N} \phi_{ij}(x_i, x_j) K \quad (2)$$

where $\phi_i$ encode the cost of assigning a label $x_i$ and $\phi_{ij}$ are pairwise potentials that encourage neighboring (N) nodes to take the same label, and K is a constant. The unary potential functions force the estimated labels x to be consistent with the observations y, ie. $\phi_i(x_i)$=inf if $y_i$≠−1 and $x_i$≠$y_i$, and $\phi_i(y_i)$=0 for all other cases, while the pairwise potentials take the form an Ising model. The Maximum a Posteriori (MAP) labeling under the model can be computed in polynomial time using graph cuts. However, the results are underwhelming as the pairwise model does not encode any information about how boundaries should be completed. It simply encourages a labeling that has a small number of discontinuities.

1.4.4.2 Contour Completion Random Field

One embodiment of the technique employs a CCRF model as previously discussed. The mathematical computations for applying the CCRF model to complete contours of occluded surfaces are now described.

It has been observed that although a large number of neighboring pixel pairs take different labels, the majority of these pixels have a consistent appearance. Therefore potentials penalizing segmentations with a large number of types of figure-ground transitions are defined. This is in contrast to the standard MRF which penalizes the absolute number of transitions. This CCRF model does not suffer from the short boundary bias as the energy does not grow with the number of transitions if they are of the same type, i.e., have the same appearance.

Unlike methods where higher order potentials are defined over disjoint edge groups that are clustered based on appearance, in CCRF the higher order potential are defined over overlapping sets of edges where each set follows some simple (low-dimensional) primitive curve shape such as a line or a circle. The energy function for the CCRF model can be written as:

$$E(x) = \Sigma_{i \in S} \phi_i(x_i) + \Sigma_{g \in G} \psi_g(x) \quad (3)$$

where $\psi_g$ are curve completion potentials, and G is a set where each curve g represents a set of nodes (edges) that follow a curve. The curve completion potentials have a diminishing returns property. More formally, $$\psi_g(x) = F(\Sigma_{ij \in E_g} \psi_{ij}(x_i, x_j)), \quad (4)$$

where $E_g$ is the set of edges that defines the curve or edge group g. F is a non-decreasing concave function. In experiments, F was defined as an upper-bounded linear function ie. $F(t)=\min\{\lambda^* t, \theta\}$ where $\lambda$ is the slope of the function and $\theta$ is the upper-bound. It can be seen that once a few edges are cut t≥$\theta/\lambda$, the rest of the edges in the group can be cut without any penalty. This behavior of the model does not prevent the boundary in the labeling from including large number of edges as long as they belong to the same group (curve).

1.4.4.2.1 Transforming Curve Completion Potentials to a Pairwise Model

It has been demonstrated that potentials of the form of equation (4) can be transformed into a sum of pairwise potentials with the addition of auxiliary variables. Concretely, the minimization over the curve completion potentials can be written as the minimization of a submodular pairwise pseudo-boolean function with the addition of one variable per edge and one variable per edge group. The minimization problem over the higher-order curve completion potential (4) can be transformed to $$\Psi_g(x) = T + \min_{h_g, z} \left\{ \sum_{ij \in E_g} \theta_{ij}((x_i + x_j - 2z_{ij})h_g - 2(x_i + x_j)z_{ij} + 4z_{ij}) - Th_g \right\}, \quad (5)$$

where $h_g$ is the binary auxiliary corresponding to the group g, and $z_{ij}$, ∀$_{ij}$∈$E_g$ are binary auxiliary variables corresponding to the edges that constitute the edge group g.

1.4.4.2.2 Constraining the Edge Groups

In addition to the higher order terms above, a series of constraints on the set of edge groups is introduced. In particular, edge groups can be organized hierarchically so that a set of possible edges have a parent and only a single child per parent may be active. These constraints are formalized using the binary auxiliary variables:

$$E(x) = \sum_{i \in S} \phi_i(x_i) + \sum_{g \in G} \Psi_g(x) \quad s.t. \sum_{k \in c(g)} h_k \leq 1 \quad (6)$$

where c(g) denotes the set of child edge groups for each parent g. The addition of these constraints does not alter the inference mechanism as the technique follows a greedy inference method described to minimize the CCRF energy (3) by solving a series of submodular pseudo-boolean function minimization problems using graph cuts. Because the strategy is greedy, the technique simply does not allow a child edge group to be selected if its parent is not already active. The exact nature of these groups are described below.

1.4.5 Defining Edge Groups

As shown in block 406, the surface reconstruction contour completion technique embodiments described herein infer scene boundaries and interior surfaces. In one embodiment, this is done by detecting lines and parabolas along the contour of each known pixels and inferring (or halluncating) edge groups. The CCRF model is then used to infer the extent of the surfaces.

In one embodiment two types of edge groups are considered to define the edges of surfaces, namely straight lines and parabolas. While previous work has demonstrated the ability of the Hough transform to detect other shapes, such as circles and ellipses, such high parameter shapes require substantially more memory and computation. It was found that lines and parabolas are sufficiently flexible to capture most of the cases encountered and these are used by the surface reconstruction contour completion technique to complete the contours of surfaces.

1.4.5.1 Detecting Lines

To detect lines, in one embodiment a modified Hough transform is used to not only detect lines, but also the direction of the transition (the plane to free space or vice-versa). In one embodiment an accumulator is used with 3 parameters: ρ, the distance from the origin to the line, θ, the angle between the vector from the origin to the line and the X axis, and a quaternary variable d, which indicates the direction of the transition (both bottom-top and left-right directions) (in one embodiment the technique uses 400 angular bins for θ and evenly spaced bins ρ 1 unit apart. The minimum number of votes allowed is set to 10). Following the accumulation of votes, non-maximal suppression is run and an edge group for each resulting line is created.

1.4.5.2 Detecting Parabolas

The standard Hough transform for parabolas requires four parameters. To avoid the computational and memory demands of such a design, a novel and simple heuristic is introduced. First, the technique identifies each point in the input image which falls at the intersection of free space, occupied and unknown pixels. These intersections are referred to as contact points. Furthermore, all pixels occupied by a plane and bordering free space are referred to as contour points.

To close an occluded contour, a parabola either connects a set of contact points or continues at a contact point until it reaches the end of the image. It is noted that only contact points that border the same occlusion region can possibly be bridged. Therefore, a set of contact point pairs $\xi$ is created from which parabolas will be estimated. If multiple contact points all border the same occlusion region, each contact point is paired with its nearest neighbor. For each pair of contact points, a parabola is fit to all of the contour points that immediately border each contact point. Because the parabola may be rotated, first these bordering contour points are rotated so that the normal of the line joining the contact points is aligned with the Y-axis. To avoid over or under fitting the contour, the contour points are sampled using several radii and the parabola is kept most consistent with the observed contour. If a contact point cannot be paired, or if a pair provides only poor fits, a parabola is fit using its immediate contour point neighbors for each side separately. This fast parabola fitting process is summarized in Table 1.

TABLE 1

Fast Parabola Fitting Process

Data: Ternery Image Y, set of search radii T
Results: List of Edge Groups G
C = FindContactPoints(Y)
$\xi$ = FindPairsOfContactPoints(C, Y)
for $v_i, v_j \in \xi$ do
   Initialize vote vector to all zeros
   $\theta_\tau = 0 \ \forall \ \tau \in |T|$;
   for $\tau \in T$ do
      P = FindNeighboringContourPoints($v_i, v_j, \tau$)
      P' = RotatePoints(P)
      α = LeastSquaresFit(P')
      Q' = sampleParabola(α)
      Q = rotateBackToImageCoordinates(Q)
      g = defineEdgeGroup(Q)
      $\theta_\tau$ = CountVotesFromEdgeGroup(g, Y)
   end
   Append(G, BestParabola(θ))
end

1.4.5.3 Hallucinating Edges

While using detected lines or curves may encourage the correct surface boundaries to be inferred in many cases, in others, there is no evidence present in the image of how a shape should be completed. Adding edge groups whose use in completion would help provide for shapes that exhibited simple closure and symmetry. More specifically, for each observed line detected, additional parallel edge groups are added on the occluded side of the shape.

1.4.6 Inferring Scene Boundaries

As shown in FIG. 4, block 406, edges of the classified surfaces are determined and scene boundaries and interior surface boundaries are inferred. To summarize, the edge groups are obtained by fitting lines and parabolas to the input image thus encouraging transitions that are consistent with these edges. As indicated in Equation 6, not all edge groups can be active simultaneously and in particular, any line used to hallucinate a series of edges is considered the parent to its child hallucinated lines. Consequently, only a single hallucinated line is active (at most) at a time.

To extend and fill the scene boundaries, the free space of the input TSDF and the wall planes (predicted by the classifier) are projected onto the floor plane. Given a 2D point cloud induced by these projections the points are discretized to form a projection image where each pixel $y_l$ takes on the value of free space, wall or unknown. To infer the full scene layout, the CCRF (Equation 3) is applied to infer the values of the unknown pixels. In this case, free space is considered to be the area to be expanded ($y_i$=1) and the walls to be the surrounding area to avoid being filled ($y_i$=0). The lines and curves of the walls are first detected to create a series of edge groups. Next, $\phi_i(x_i=1)=\infty$ if $y_i=0$ and $\phi_i(x_1=0)=\infty$ if $y_i=1$. Finally, in one embodiment a slight bias is added to assigning free space $\phi_i(x_i=0)=\epsilon$ where $\epsilon=1e-6$.

1.4.7 Extending Planar Surfaces

As shown in FIG. 4, block 406, once the scene boundary has been completed, the full extent of internal planar surfaces is also inferred. For each internal plane, the TSDF is projected onto the detected 2D plane as follows. First a coordinate basis is found for the plane using Principal Component Analysis (PCA) and the major and and minor axes of the plane are estimated, M and N, respectively. Next, an image of size 2N+1×2M+1 is created where the center pixel of the image corresponds to the centroid of the plane. A grid is sampled along the plane basis of size 2N+1×2M+1 where the TSDF values sampled in each grid location are used to assign each of the image's pixels. If the sampled TSDF value is occupied, $y_i$ is set to 1, if its free space $y_i$ is set to 0 and if its unknown, $y_i$ is set to −1. In practice, several voxels away from the plane are also sampled (along the surface normal direction). This heuristic has the effect of reducing the effects of sensor noise and error from plane fitting.

Once Y has been created, all lines and parabolas in the image are detected and the necessary lines hallucinated to create the edge groups. Next, the local potentials are assigned in the same manner as described previously.

1.5 Augmenting the Original Volume

As shown in FIG. 4, block 408, the inferred scene boundaries and interior surfaces are used to augment the 3D reconstruction volume. The result of the scene completion is an enclosed scene boundary, and extended interior object surface planes. As the final step in the pipeline the original TSDF imported is augmented. In one embodiment, for the scene boundary the resulting polyline representing the boundary is simplified, and points along this boundary from floor to ceiling height are sampled. For the interior planes the technique samples points in the extended parts of the planes. For each sampled point (sampled densely as required, in this case γ) a bresenham-line is traversed in the volume from the voxel closest to the point, and in two directions, its normal and the inverse to its normal. For each encountered voxel, the TSDF value is updated with the distance to the surface. If the dimensions of the original volume do not suffice to hold the new scene boundaries, a new larger volume is created and the original TSDF is copied to it, before augmenting it.

The augmented TSDF, in the originating surface reconstruction pipeline, is continuously updated with new evidence (e.g. as the user moves). Augmented areas are phased out as the voxels which they filled become known.

2.0 Exemplary Usage Scenarios and Alternate Embodiments

The following paragraphs provide some exemplary usage scenarios and alternate embodiments. Many other usage scenarios and embodiments are possible.

2.1 Gaming Applications

The surface reconstruction contour completion technique embodiments described herein can be used to augment scenes in various gaming applications. For example, a room can be scanned with a depth sensor and a 3D partial reconstruction volume can be created of the room. This can then be used to augment the 3D partial reconstruction volume to show objects and items partially occluded. Graphically generated characters and gaming elements can also be overlayed.

2.2 Interior Design/Construction

The surface reconstruction contour completion technique embodiments described herein can be used to augment scenes in various interior design and construction applications. An augmented model of a captured room can be used to show all aspects of the room in order to allow consumers to to visualize how their furniture will look when installed in a room.

2.3 3D Printing

In 3D printing a 3D model is sent to the 3D printer in order for the printer to create a physical object. The surface reconstruction contour completion technique embodiments described herein can be used to create such a model.

2.4 Robotic Applications

In some scenarios indoor robots are used to traverse a room, for example, to find a person or to find an explosive device. The surface reconstruction contour completion technique embodiments described herein can be used to create such a model of a room in order to guide a robot through previously unmapped spaces.

2.5 Object Cutout

In some scenarios a user may want to cut an object out of the existing geometry of a modeled scene or reconstruction volume. The surface reconstruction contour completion technique embodiments described herein can be used to replace object cutouts to complete the reconstruction volume.

3.0 Exemplary Operating Environment

Figure 5:
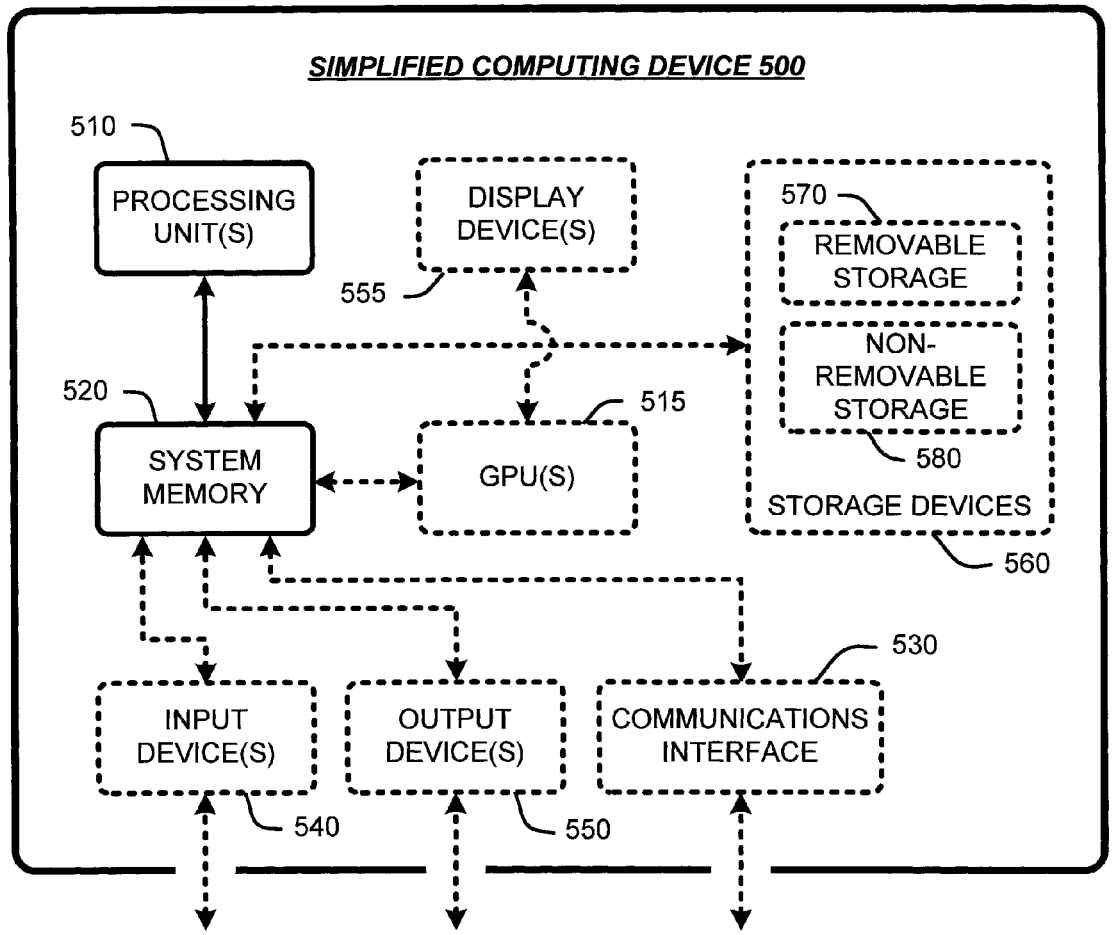
FIG. 5 is a schematic of an exemplary computing environment which can be used to practice various embodiments of the surface reconstruction contour completion technique.

The surface reconstruction contour completion technique embodiments described herein are operational within numerous types of general purpose or special purpose computing system environments or configurations. FIG. 5 illustrates a simplified example of a general-purpose computer system on which various embodiments and elements of the surface reconstruction contour completion technique, as described herein, may be implemented. It is noted that any boxes that are represented by broken or dashed lines in the simplified computing device 500 shown in FIG. 5 represent alternate embodiments of the simplified computing device. As described below, any or all of these alternate embodiments may be used in combination with other alternate embodiments that are described throughout this document. The simplified computing device 500 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to implement the surface reconstruction contour completion technique embodiments described herein, the device should have a sufficient computational capability and system memory to enable basic computational operations. In particular, the computational capability of the simplified computing device 500 shown in FIG. 5 is generally illustrated by one or more processing unit(s) 510, and may also include one or more graphics processing units (GPUs) 515, either or both in communication with system memory 520. Note that that the processing unit(s) 510 of the simplified computing device 500 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 500 shown in FIG. 5 may also include other components such as a communications interface 530. The simplified computing device 500 may also include one or more conventional computer input devices 540 (e.g., pointing devices, keyboards, audio (e.g., voice) input devices, video input devices, haptic input devices, gesture recognition devices, devices for receiving wired or wireless data transmissions, and the like). The simplified computing device 500 may also include other optional components such as one or more conventional computer output devices 550 (e.g., display device(s) 555, audio output devices, video output devices, devices for transmitting wired or wireless data transmissions, and the like). Note that typical communications interfaces 530, input devices 540, output devices 550, and storage devices 560 for general-purpose computers are well known to those skilled in the art, and will not be described in detail herein.

The simplified computing device 500 shown in FIG. 5 may also include a variety of computer-readable media. Computer-readable media can be any available media that can be accessed by the computer 500 via storage devices 560, and can include both volatile and nonvolatile media that is either removable 570 and/or non-removable 580, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), compact discs (CDs), floppy disks, tape drives, hard drives, optical drives, solid state memory devices, random access memory (RAM), read-only memory (ROM), electrically erasable programmable read-only memory (EEPROM), flash memory or other memory technology, magnetic cassettes, magnetic tapes, magnetic disk storage, or other magnetic storage devices.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various surface reconstruction contour completion technique embodiments described herein, or portions thereof, may be stored, received, transmitted, or read from any desired combination of computer-readable or machine-readable media or storage devices and communication media in the form of computer-executable instructions or other data structures.

Finally, the surface reconstruction contour completion technique embodiments described herein may be further described in the general context of computer-executable instructions, such as program modules, being executed by a computing device. Generally, program modules include routines, programs, objects, components, data structures, and the like, that perform particular tasks or implement particular abstract data types. The surface reconstruction contour completion technique embodiments may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

4.0 Other Embodiments

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process for completing a partially reconstructed three dimensional scene (3D), comprising:
   receiving a dense partial reconstruction volume of a three dimensional scene;
   detecting surfaces in the dense partial reconstruction volume;
   classifying the surfaces into different types of surfaces;
   determining scene boundaries of the dense partial reconstruction volume of the scene using the classified surfaces;
   determining boundaries of partially occluded surfaces of objects in the dense partial reconstruction volume using the classified surfaces;
   updating the dense partial reconstruction volume to show the determined boundaries of partially occluded surfaces of objects in the scene and the scene boundaries; and
   using a contour completion process to update contours of the scene boundaries and the boundaries of the partially occluded surfaces of objects in the dense partial reconstruction volume,
   wherein the contours are completed by using lines and parabolas fitted to visible parts of the contours.

2. The computer-implemented process of claim 1, wherein the dense partial reconstruction volume is received from a surface reconstruction pipeline that maintains the dense partial reconstruction volume of the scene that is updated with new depth observations of the scene.

3. The computer-implemented process of claim 1, further comprising fitting parabolas to visible parts of the contours of the scene boundaries and the boundaries of the partially occluded surfaces of objects by:
   projecting the visible parts of the contours onto a two-dimensional image;
   identifying contact points in the two-dimensional image which fall at an intersection of free-space, occupied, and unknown pixels;

finding contour points in the two-dimensional image that are on a contour of a planar surface and bordering free space; and enclosing an occluded contour by fitting a parabola so that the parabola either connects to a set of contact points or continues from a contact point until it reaches an end of the two-dimensional image.

4. The computer-implemented process of claim 1, wherein the contour completion process minimizes an energy function that determines whether a point lies on a contour of a surface and labels the point as being whether on the contour of the surface.

5. The computer-implemented process of claim 1, wherein the dense partial reconstruction volume of the scene is expressed as a volume of voxels.

6. The computer-implemented process of claim 5, wherein every voxel is labeled as, occupied when having an observed surface at that voxel, free-state when there is no observed surface at that voxel, or unknown.

7. The computer-implemented process of claim 1, wherein the dense partial reconstruction volume of the scene is expressed as a truncated signed distance function grid of voxels with a surface normal.

8. The computer-implemented process of claim 1, wherein each surface is classified into a semantic class of a plurality of semantic classes.

9. The computer-implemented process of claim 8, wherein each surface is classified into a semantic class of floor, wall, ceiling, and internal, wherein surfaces classified as one of floor, wall and ceiling are used to infer scene boundaries, and wherein internal surfaces are extended and filled.

10. The computer-implemented process of claim 8, wherein the surfaces in the dense partial reconstruction volume are classified into the plurality of semantic classes using a trained classifier that predicts each surface's class using ground truth labels and 3D features and that captures attributes of each surface including its height, size and surface normal distribution.

11. The computer-implemented process of claim 10, wherein the trained classifier is a Random Forest classifier.

12. A computer-implemented process for completing a dense partial 3D reconstruction volume of a scene, comprising:

detecting surfaces in the dense partial 3D reconstruction volume of the scene;

classifying the detected surfaces into different types of surfaces;

augmenting the dense partial 3D reconstruction volume of the scene to show greater portions of partially occluded surfaces of objects in the scene and scene boundaries of the dense partial 3D reconstruction volume of the scene using the classified surfaces and a contour completion procedure, wherein the augmenting the dense partial 3D reconstruction volume of the scene comprises:

determining the scene boundaries of the dense partial 3D reconstruction volume of the scene using the classified surfaces;

determining boundaries of partially occluded surfaces of objects in the dense partial 3D reconstruction volume using the classified surfaces;

updating the dense partial 3D reconstruction volume to show the determined boundaries of partially occluded surfaces of objects in the scene and the scene boundaries;

using a contour completion process to update contours of the scene boundaries and the boundaries of the partially occluded surfaces of objects in the dense partial 3D reconstruction volume, wherein the contours are completed by using lines and parabolas fitted to visible parts of the contours.

13. The computer-implemented process of claim 12, further comprising continuously updating with new data the completed dense partial 3D reconstruction volume as the scene changes.

14. The computer-implemented process of claim 13, further comprising phasing out augmented portions of the augmented dense partial 3D reconstruction volume as augmented portions of the augmented dense partial 3D reconstruction volume become known.

15. A system for completing a dense partial 3D reconstruction of a scene, comprising:

one or more computing devices; and a computer program having program modules executable by the one or more computing devices, the one or more computing devices being directed by the program modules of the computer program to;

classify planar surfaces detected in the dense partial 3D reconstruction of the scene; and update the dense partial 3D reconstruction to show greater portions of partially occluded surfaces of objects in the scene and scene boundaries by using the classified planar surfaces to complete visible contours of the classified planar surfaces, wherein the updating the dense partial 3D reconstruction comprising:

determining the scene boundaries of the dense partial 3D reconstruction of the scene using the classified planar surfaces;

determining boundaries of the partially occluded surfaces of objects in the scene using the classified planar surfaces;

updating the dense partial 3D reconstruction to show the determined boundaries of partially occluded surfaces of objects in the scene and the scene boundaries;

using a contour completion process to update contours of the scene boundaries and the boundaries of the partially occluded surfaces of objects in the scene, wherein the contours are completed by using lines and parabolas fitted to visible parts of the contours.

16. The system of claim 15, wherein the detected planar surfaces are updated in real time.

17. The system of claim 16, wherein the dense partial 3D reconstruction of the scene is received via a network from an on-line surface reconstruction pipeline.

* * * * *